United States Patent
Gustafsson (10) Patent No.: US 10,349,105 B2
(45) Date of Patent: Jul. 9, 2019

(54) CHANNEL CHANGE PROCESSING USING STORED CONTENT

(71) Applicant: ARRIS Enterprises LLC, Suwanee, GA (US)

(72) Inventor: Marcus Gustafsson, Linkoping (SE)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/350,684

(22) Filed: Nov. 14, 2016

(65) Prior Publication Data

US 2018/0139496 A1 May 17, 2018

(51) Int. Cl.

| | |
|---|---|
| H04N 7/173 | (2011.01) |
| H04N 21/2662 | (2011.01) |
| H04N 21/222 | (2011.01) |
| H04N 21/231 | (2011.01) |
| H04N 21/234 | (2011.01) |
| H04N 21/2343 | (2011.01) |
| H04N 21/239 | (2011.01) |
| H04N 21/438 | (2011.01) |
| H04N 21/6405 | (2011.01) |
| H04N 21/845 | (2011.01) |

(52) U.S. Cl.
CPC ..... *H04N 21/2662* (2013.01); *H04N 21/2221* (2013.01); *H04N 21/2343* (2013.01); *H04N 21/2393* (2013.01); *H04N 21/23106* (2013.01); *H04N 21/23418* (2013.01); *H04N 21/4384* (2013.01); *H04N 21/6405* (2013.01); *H04N 21/8455* (2013.01); *H04N 21/8456* (2013.01)

(58) Field of Classification Search
USPC ........................................................ 725/86
See application file for complete search history.

(56) References Cited

U.S. PATENT DOCUMENTS 5,477,542 A * 12/1995 Takahara ................. H04J 3/177
  348/14.05
6,292,834 B1 * 9/2001 Ravi ................. H04L 29/06027
  375/E7.004

(Continued)

FOREIGN PATENT DOCUMENTS

EP 1811780 B1 7/2012

OTHER PUBLICATIONS

D. Spadaro, "iMOP: Improving Multicast Only Performance in Layer 2 Access Networks", CS290F Networking for Multimedia, 4 pgs.

*Primary Examiner* — Michael B. Pierorazio
(74) *Attorney, Agent, or Firm* — Lori Anne D. Swanson (57) ABSTRACT

Particular embodiments use a fast channel change (FCC) process that stores an amount of content at a network device for channels that are available to a subscriber. The network device can join video streams for channels to receive content for all the channels. The network device then stores a portion of the content for all the channels in storage. When the set-top box requests a channel change, the set-top box sends a join request for the requested channel to the network device. Then, the network device sends the stored content for the requested channel to the set-top box. The stored content allows the channel change to be performed faster because the stored content is sent at wire speed and then once the join of the channel is processed, the content for the channel that is received from the regular video stream can then be sent per the channel requirements.

20 Claims, 8 Drawing Sheets

(56) References Cited

U.S. PATENT DOCUMENTS

| | | | | |
|---|---|---|---|---|
| 6,728,965 B1* | 4/2004 | Mao | ............... | H04N 5/4401 |
| | | | | 348/526 |
| 7,237,251 B1* | 6/2007 | Oz | ............... | H04N 5/4401 |
| | | | | 348/E5.006 |
| 7,571,246 B2* | 8/2009 | Virdi | ............ | H04N 21/234381 |
| | | | | 709/232 |
| 8,023,511 B2* | 9/2011 | Komiya | ............ | H04L 12/1881 |
| | | | | 370/230 |
| 8,249,141 B1* | 8/2012 | Harris | ............... | H04L 65/80 |
| | | | | 375/240 |
| 8,925,021 B2* | 12/2014 | Ma | ............ | H04N 21/234309 |
| | | | | 725/86 |
| 8,990,351 B2* | 3/2015 | Isaksson | ............ | H04L 47/2416 |
| | | | | 709/219 |
| 9,106,787 B1* | 8/2015 | Holmer | ............ | H04L 43/087 |
| 2006/0080724 A1* | 4/2006 | Vermeiren | ............ | H04N 5/4401 |
| | | | | 725/131 |
| 2010/0017443 A1* | 1/2010 | Xie | ............ | H04L 67/1095 |
| | | | | 707/E17.007 |
| 2010/0037267 A1* | 2/2010 | Bennett | ............ | H04N 7/165 |
| | | | | 725/56 |
| 2011/0109808 A1 | 5/2011 | Li et al. | | |
| 2013/0014156 A1* | 1/2013 | Seo | ............ | H04N 21/236 |
| | | | | 725/32 |
| 2015/0026746 A1* | 1/2015 | Fondberg | ............ | H04L 65/4084 |
| | | | | 725/112 |

\* cited by examiner

CHANNEL CHANGE PROCESSING USING STORED CONTENT

BACKGROUND

In television (TV) broadcasts, faster channel changes are desirable. For example, when a user changes from a first channel to a second channel, the delay in the display of video for the second channel should be minimized. In one example, a solution for a fast channel change (FCC) requires that a set-top box (STB) interact with a dedicated FCC server in the network. This requires that the STB to first send a channel change request to the FCC server. The FCC server then sends a small amount of video data for the second channel to the set-top box, which displays the video. Also, the set-top box can then send a join for a multicast stream for the second channel to another network device. Once the join is processed, the network device sends video for the second channel to the set-top box. The small amount of video from the FCC server makes the channel change seem faster because this video is displayed while the join request is processed. However, this solution requires that the set-top box send multiple requests. Also, the set-top box needs to analyze the video data from the FCC server and also the multicast data from the network server to determine a good switchover point from the FCC video data to the multicast video data.

DETAILED DESCRIPTION

Described herein are techniques for a fast channel change system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments use a fast channel change (FCC) process that stores an amount of content at a network device for channels that are available to a subscriber. The network device is a device that may be in an external network position that is closest to a subscriber's set-top box (STB), such as a last router on a multicast route. The network device can join video streams for channels to receive content for all the channels. The network device then stores a portion of the content for all the channels in storage. When the set-top box requests a channel change, the set-top box sends a join request for the requested channel to the network device. Then, the network device sends the stored content for the requested channel to the set-top box. In one embodiment, the stored data may be sent at a faster bitrate than the normal bitrate for the content that is normally sent for a channel when not processing a channel change. For example, the faster bitrate is wire speed, which may be the fastest bitrate available to send the content without incurring errors. The stored content allows the channel change to be performed faster because the stored content is sent at wire speed and then once the join of the channel is processed, the content for the channel that is received from the regular video stream can then be sent to the set-top box per the channel requirements.

In the fast channel change process, the set-top box does not need to process content from different network devices. Rather, the same network device that normally sends content to the set-top box processes the channel change. Further, the system may increase the length of a group of pictures (GOP) that is used to encode the video. The increased group of picture length may lower the bandwidth required to send content for the channels. However, the increased GOP length may increase the time for a channel change because the set-top box has to decode more pictures before starting to display the content. But, particular embodiments use the stored data that is sent at wire speed to the set-top box to decrease the channel change time. Thus, by using the stored data and processing the channel change at the network device that normally sends the video to the set-top box, a fast channel change can be performed in addition to lowering the bitrate used by each channel.

System Overview

Figure 1:
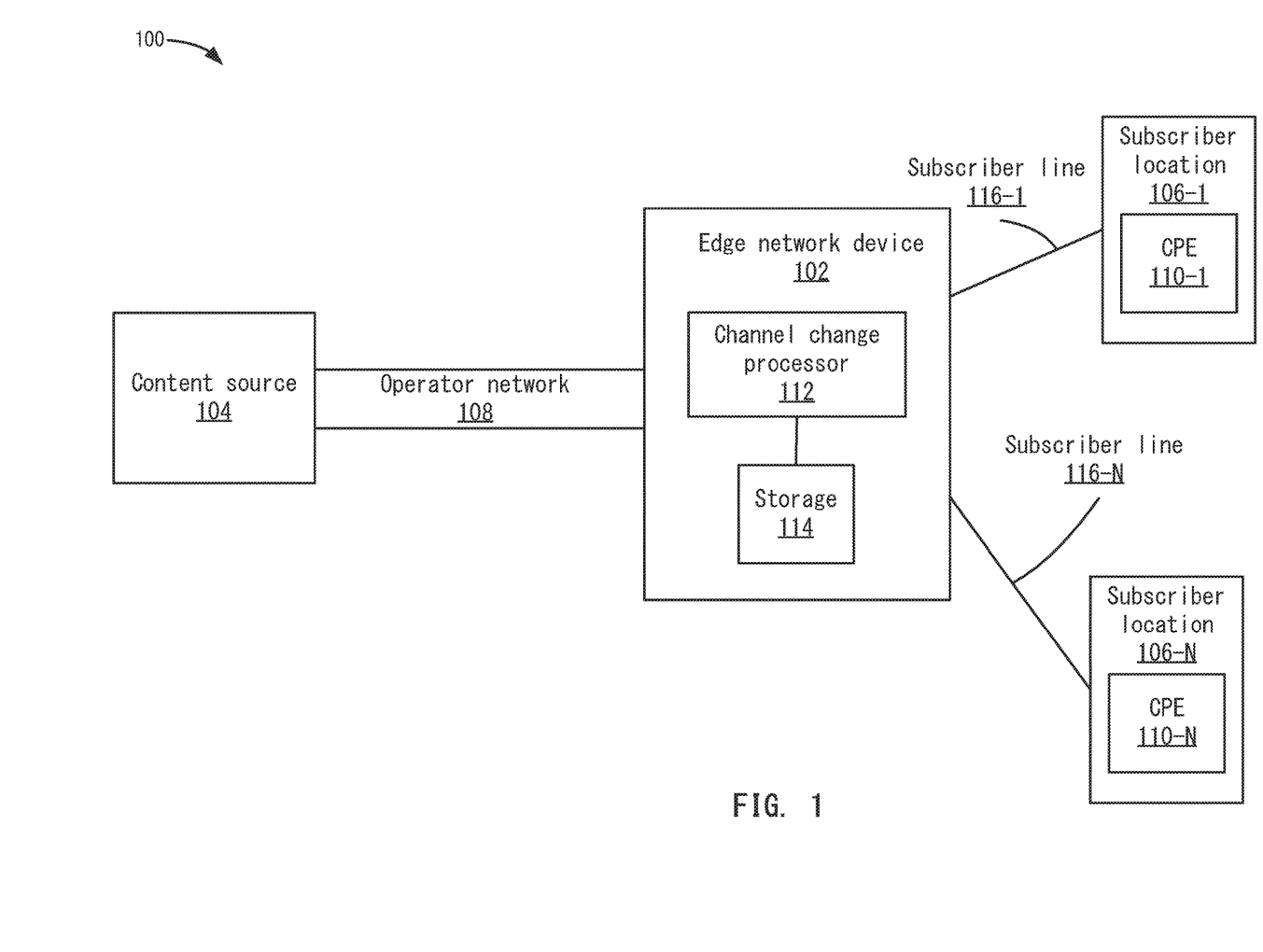
FIG. 1 depicts a system for processing channel changes according to one embodiment.

FIG. 1 depicts a system 100 for processing channel changes according to one embodiment. System 100 includes an edge network device 102, a content source 104, and subscriber locations 106-1-106-N. Other network devices may also be used to deliver content from content source 104 to subscriber locations 106, but are not shown.

Content source 104 may be a network device, such as a network head-end device, that delivers content through a network 108 to edge network device 102. Content source 104 may transmit content for multiple channels. For example, the channels may be various channels, such as network television channels, that are provided by a distributor. Also, the content may include video data and/or audio data. For example, the content includes television shows, movies, sporting events, etc.

The content may be included in video streams, such as multicast video streams. Multicast is a method of sending the content to a group of receivers in a single transmission. Although multicast is described, other methods of transmission may also be used, such as unicast or adaptive transmission. In one embodiment, each channel is included in its own video stream. Also, since edge network device 102 is requesting content for all the channels, multicast may need to be used to efficiently use the bandwidth for network 108. That is, if unicast is used, the number of links and bandwidth used would be greater than desired.

Edge network device 102 may be a device in an operator network 108 that is closest to subscriber locations 106. For example, edge network device 102 may be the last router in a multicast route to customer premise equipment 110, such as a Digital Subscriber Line Access Multiplexer (DSLAM). Although not shown, network 108 may include different network elements, such as routers and switches that are used to send the content from content source 104 to edge network device 102.

Also, edge network device 102 may include a single port for each subscriber location 106. That is, a 1:1 port-to-port relationship is found between edge network device 102 and each respective subscriber locations 106. In this case, a port in edge network device 102 may be only connected to a port at subscriber location via a subscriber line 116. In one embodiment, subscriber lines 116-1-116-N respectively connect to customer premise equipment (CPE) 110-1-110-N.

Subscriber locations 106 include customer premise equipment 110-1-110-N that receive the content from edge network device 102. In one embodiment, customer premise equipment 110 may be a set-top box (STB), but may include other receivers, computers, gateways, modems, or other devices that can process the content. Customer premise equipment 110 may then display the content on a display device, such as a television.

Customer premise equipment 110 may include hardware and/or software that allows users to perform channel changes to view different content on another channel. Additionally, customer premise equipment 110 may include storage that stores the content and decoders that can decode the content for display on the display devices.

Edge network device 102 is the network device that sends the content for a current channel the user is watching to customer premise equipment 110. Also, edge network device 102 processes the channel change requests. The processing is performed at edge network device 102 without the use of another device that is storing content for the channels. Thus, edge network device 102 processes the channel change request and also sends the content to the customer premise equipment 110 after the channel change request is processed and the channel has been changed.

Edge network device 102 includes a channel change processor 112 that performs the fast channel change process when a channel change occurs. In one embodiment, channel change processor 112 can join all of the channels (or only a portion of the channels in which a fast channel change is desired) and receive the content for the channels from content source 104. Then, channel change processor 112 can store some of the content in storage 114, which may be cache memory or other types of storage. In one embodiment, channel change processor 112 can store at least a group of pictures (GOP) in storage 114 for each channel. The group of pictures is a number of pictures or frames that customer premise equipment 110 needs to decode and display a set of pictures. That is, if one picture in the group of pictures is not included, then the decoding of the group may not be possible or may include errors.

When a channel change occurs, edge network device 102 can send the group of pictures to a customer premise equipment 110 that requested the channel change. This group of pictures can be sent at a speed faster than the normal channel bandwidth, such as at wire speed. Then, customer premise equipment 110 can decode and display the group of pictures while edge network device 102 processes the channel change. After the stored group of pictures is displayed, channel change processor 112 may have processed the channel change and the video stream for the new channel can now be sent to customer premise equipment 110 at the normal bitrate (e.g., a bitrate less than wire speed).

The GOP that is stored may be X seconds of video for each channel. The content in the stored GOP may be X seconds behind the live broadcast of the video stream for the channel. This may mean the content being displayed at customer premise equipment 110 may be delayed by X seconds, but it may be less in practice. This is because the GOP is sent at wire speed, which may make up for some of the delay.

The channel change process may be simpler for customer premise equipment 110 because customer premise equipment 110 does not need to send a request to a separate FCC server. Rather, customer premise equipment 110 sends a join request to edge network device 102 for the new channel. When a join request is received at channel change processor 112, channel change processor 112 can send the stored content for the channel to customer premise equipment 110. Then, edge network device 102 processes the join for the new channel. This is a seamless process for customer premise equipment 110, and does not require customer premise equipment 110 to send two separate requests, that is, one to an FCC server and one to edge network device 102.

The fast channel change process also allows content source 104 to increase the length of the group of pictures that is used to encode the content for each channel. Using an increased length for the group of pictures would have caused a slower channel change due to the time required to send and decode a group of pictures that is used to display the content on the display device, but using the stored content in storage 114, the channel change can be performed faster. However, the longer group of pictures allows content source 104 to lower the bitrate used for each channel. This does not sacrifice quality in the video stream, but may allow content for a larger number of channels to be sent through network 108 while using the same or less bandwidth.

Storing of Content for Channels

Figure 2:
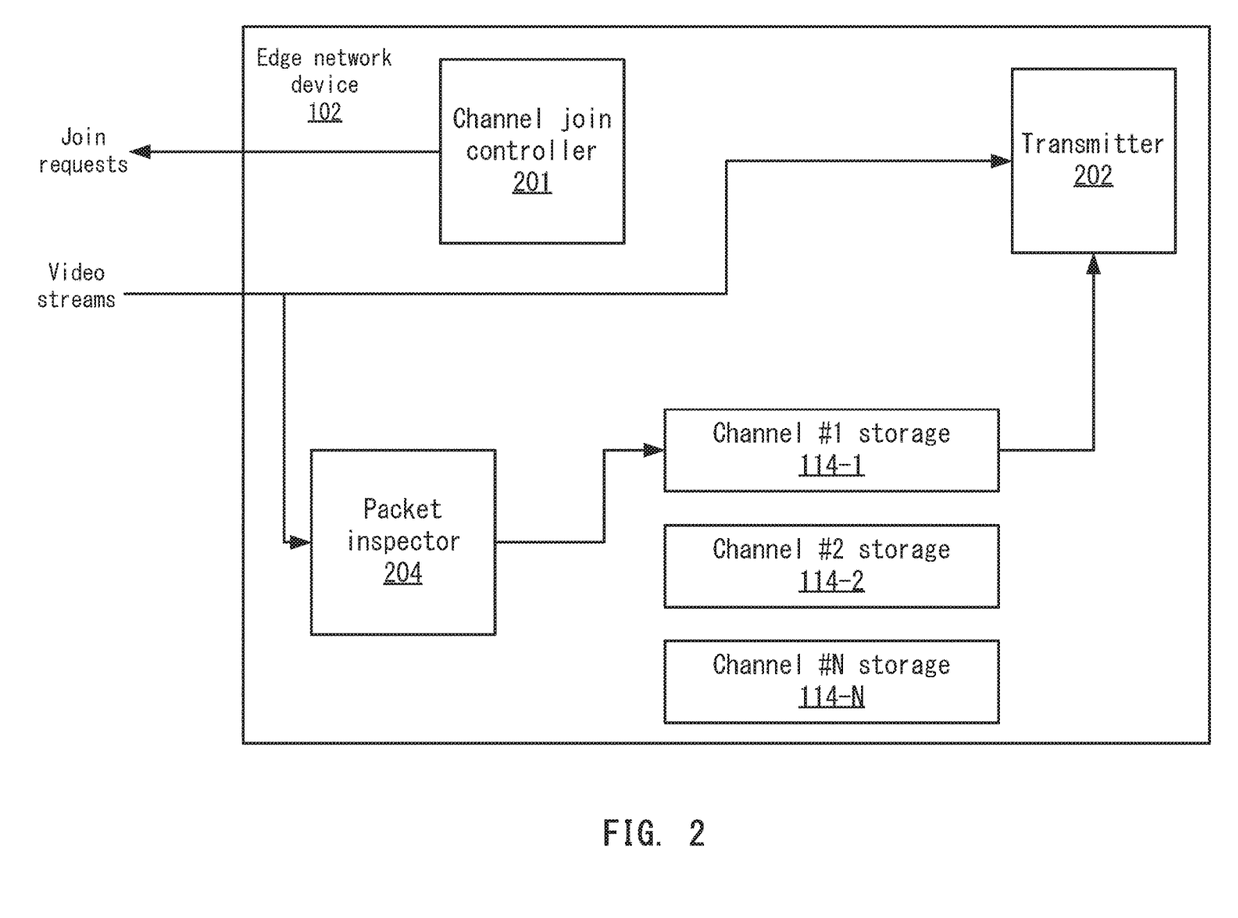
FIG. 2 depicts a more detailed example of edge network device for processing content for the channels and storing the content in storage according to one embodiment.

FIG. 2 depicts a more detailed example of edge network device 102 for processing content for the channels and storing the content in storage 114 according to one embodiment. In one embodiment, the content is sent in packets for multiple channels. In one embodiment, the packets for multiple channels may be sent in one or more video streams. In one embodiment, each channel may be sent in a video stream that is multicast to different network elements. In the normal operation (i.e., when a channel change is not being processed), edge network device 102 sends packets for a stream for a channel to a transmitter 202. Transmitter 202 can then send the packets for the channel to a customer premise equipment 110. For example, if a customer premise equipment 110-1 is watching channel #1, transmitter 202 sends packets for only channel #1 to customer premise equipment 110-1. Also, if customer premise equipment 110-2 is watching channel #2, transmitter 202 sends the packets for only channel #2 to customer premise equipment 110-2. Transmitter 202 sends the packets for the channels at a standard or normal bitrate for subscriber line 116. For example, the normal bitrate may be less than wire speed or less than the highest possible bitrate that can be used to send the content for the channel to customer premise equipment 110 without incurring errors. Also, the normal speed is a setting that is the pace the content is intended to be consumed, not faster nor slower. If the content is not paced correctly, the video decoder buffer in the customer premise equipment would overflow or underflow.

To enable the channel change process, channel change processor 112 includes a channel join controller 201 that sends joins for all channels in which a fast channel change is desired. This sends join requests to content source 102 and causes edge network device 102 to join multicast streams for the channels. In this case, edge network device 104 receives the multicast streams for all the channels.

The streams for the channels may also be forwarded to a packet inspector 204 to process and store the packets. Packet inspector 204 may use different processes for storing the content in storage 114. In one example, a time-based algorithm may store a fixed duration of content for each channel in storage 114. For example, a specific channel storage 114 for each channel is used, such as channel storages 114-1-114-N for channels #1, #2, . . . #N, respectively. In each channel storage, the same fixed duration of content for each respective channel is stored. In one embodiment, at least one GOP for each channel is stored. The duration of at least one GOP is stored in each channel storage 114. In one embodiment, if a GOP is 0.5 seconds long, then at least 0.5 seconds of content is stored in each storage 114-1-114-N.

In another embodiment, packet inspector 204 attempts to keep the start of a complete GOP at the beginning of each channel storage 114. The beginning of channel storage 114 may be a position in the channel storage that will be the next content (e.g., packet) extracted from the storage. Although the start of the channel storage is described, a pointer to the beginning to the GOP can also be used, which means the start of the GOP does not need to be at the beginning of the channel storage. As is known, the start of the GOP may be an I frame that starts the group of pictures. After the I frame, other pictures are included, such as B and P frames. These pictures have dependency on the I frame or other pictures in the GOP and are needed to decode the pictures correctly within the GOP. The next GOP may start with another I frame (or end with an I frame).

By having the start of a GOP at the beginning of channel storage 114, the first packet received by customer premise equipment 110 allows the customer premise equipment to start decoding the GOP immediately. This is different from if the middle of a GOP (resulting in an incomplete GOP) was first sent to customer premise equipment 110, then customer premise equipment 110 would have to discard the first number of packets that were received until an I frame is received, which is the start of the first complete GOP. This requires that channel storage 114 be able to handle up to two complete GOPs and also be able to keep track of the GOP start locations in channel storage 114. This is because almost two GOPs may need to be stored in channel storage 114 before it can be determined where the start of a complete GOP is. For example, if the first picture stored in channel storage 114 is right after an I frame that starts a first GOP, then the rest of that first GOP needs to be stored in channel storage 114 until the first I frame for the second GOP is stored. Then the rest of the second GOP is stored in channel storage 114. Once the second complete GOP is stored in channel storage 114, then the partial first GOP can be discarded from channel storage 114.

Packet Inspection Process

Figure 3:
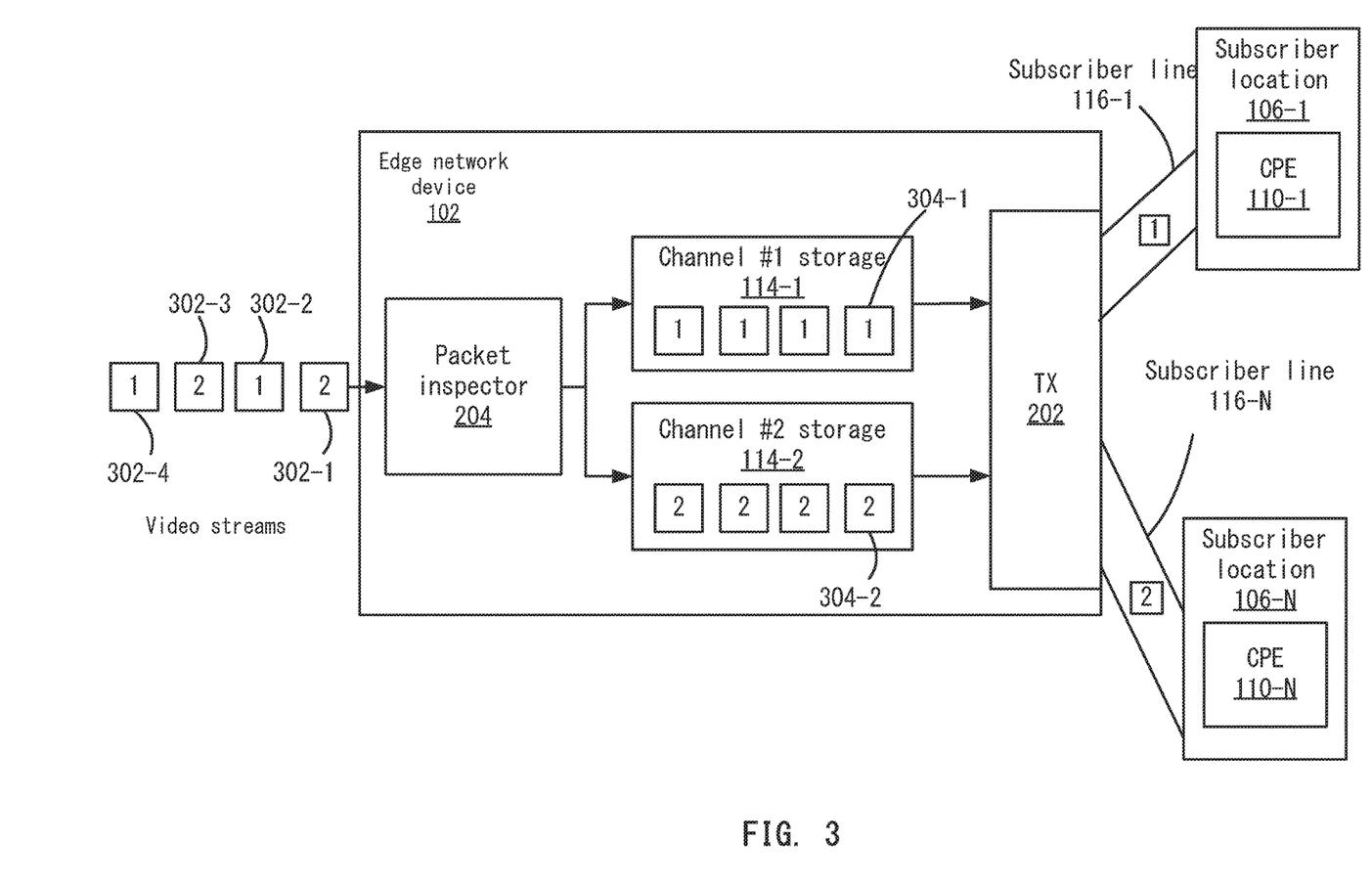
FIG. 3 shows a more detailed example of the packet inspection process according to one embodiment.

FIG. 3 shows a more detailed example of the packet inspection process according to one embodiment. This example is shown with two channels, but it will be understood that the same process is used for additional channels. Edge network device 102 receives packets 302-1-302-4 that include encoded content from network 108. Packets 302-1 and 302-3 include content for channel 2 and packets 302-2 and 302-4 include content for channel 1. Packet inspector 204 receives these packets and may inspect the packets to determine which channel the packets are for in addition to searching for the start point of the GOP.

Different methods may be used to determine the start point of the GOP. For example, packet inspector 204 may inspect the header of each packet to determine the picture type of data in the packet. Also, packet inspector 204 may review metadata for the packets to determine whether the packet is the start of the GOP or not. The methods for searching for the start of the GOP may vary based on the encoding process or encoder used. In one embodiment, video streams are transferred in transport streams via packets with a fixed header and fixed packet size, where total length is fixed, such as at 188 bytes. Each packet has a packet id (PID) field in the fixed header. The transport streams supports multiple programs (e.g., TV channels). Packet inspector 204 can determine which programs are in the stream by collecting packets with PID 0 and assembling a Program Allocation Table (PAT). The PAT lists which PIDs that are used for a Program Map Table (PMT) for each program. The PMT is a table of contents for the TV channel. The PMT lists which PIDs that are used for the video, audio, subtitles, timing (PCR), decryption data and more.

To find the GOP start, packet inspector 204 needs finds which PID is used for video in the stream. Packet inspector 204 first finds the PAT and PMTs for program. The PMT also tells packet inspector 204 which type of encoder (e.g., codec) that is used for the video (as well as the audio). Then, packet inspector 204 can scan packets for the PID. Once packet inspector 204 finds a packet with the PID, packet inspector 204 looks for fields that would indicate that a GOP start is found in this packet. For example, if the packet includes a field in the header called "Payload Start Indicator", then packet inspector 204 looks for an optional header part called "Adaptation field", which in turn contains a field called "Random Access Indicator". If both Payload Start Indicator and Random Access Indicator are signaled, then packet inspector 204 determines this packet includes data for the start of a GOP, which is also referred to as a Random Access Point (RAP). In some cases, the video stream may not properly signal the Random Access Indicator. When the Random Access Indicator is not found in the adaptation field, packet inspector 204 searches further in the payload data of the transport stream packets in the actual video data to find data start codes that indicate an I frame is present. The presence of an I frame is taken as a start of the GOP.

Once determining the respective channel for the packet, packet inspector 204 stores the content in channel storage 114. For example, as shown, packets for channel #1 are stored in channel #1 storage 114-1 and packets for channel #2 are stored in channel #2 storage 114-2. Each respective channel storage 114 only stores content for the associated channel. Content for other channels are stored also, but not shown.

As discussed above, in one embodiment, packet inspector 204 may attempt to keep the start of a GOP at the beginning of channel storage 114 that is closest to customer premise equipment 110. For example, at a position 304-1 in storage 114-1, the start of a GOP for channel #1 is stored. At a position 304-2 in storage 114-2, the start of a GOP for channel #2 is stored. When a channel change occurs, transmitter (TX) 202 receives packets from a determined channel storage 114 and sends them to a customer premise equipment 110. For example, customer premise equipment 110-1 may change to channel #1. In this case, transmitter 202 may start to send the packet at position 304-1 in channel #1 storage 114-1 through a subscriber line 116-1. Transmitter 202 continues to send packets from channel #1 storage 114-1 until the entire GOP is sent. Although only one GOP is described, an additional number of GOPs that are stored in channel #1 storage 114-1 may also be sent in other implementations. However, for discussion purposes, only one GOP is sent. As discussed above, transmitter 202 sends the GOP at wire speed through subscriber line 114-1. This may send the GOP at a higher bitrate than the normal bitrate for the channel. In this case, customer premise equipment 110-1 may be displaying content for channel #1 that is delayed by one GOP duration, but since the GOP was sent at wire speed, which is faster than the normal bitrate, the delay may be less than that when compared to the live scenario.

Channel Change Processing

Figure 4:
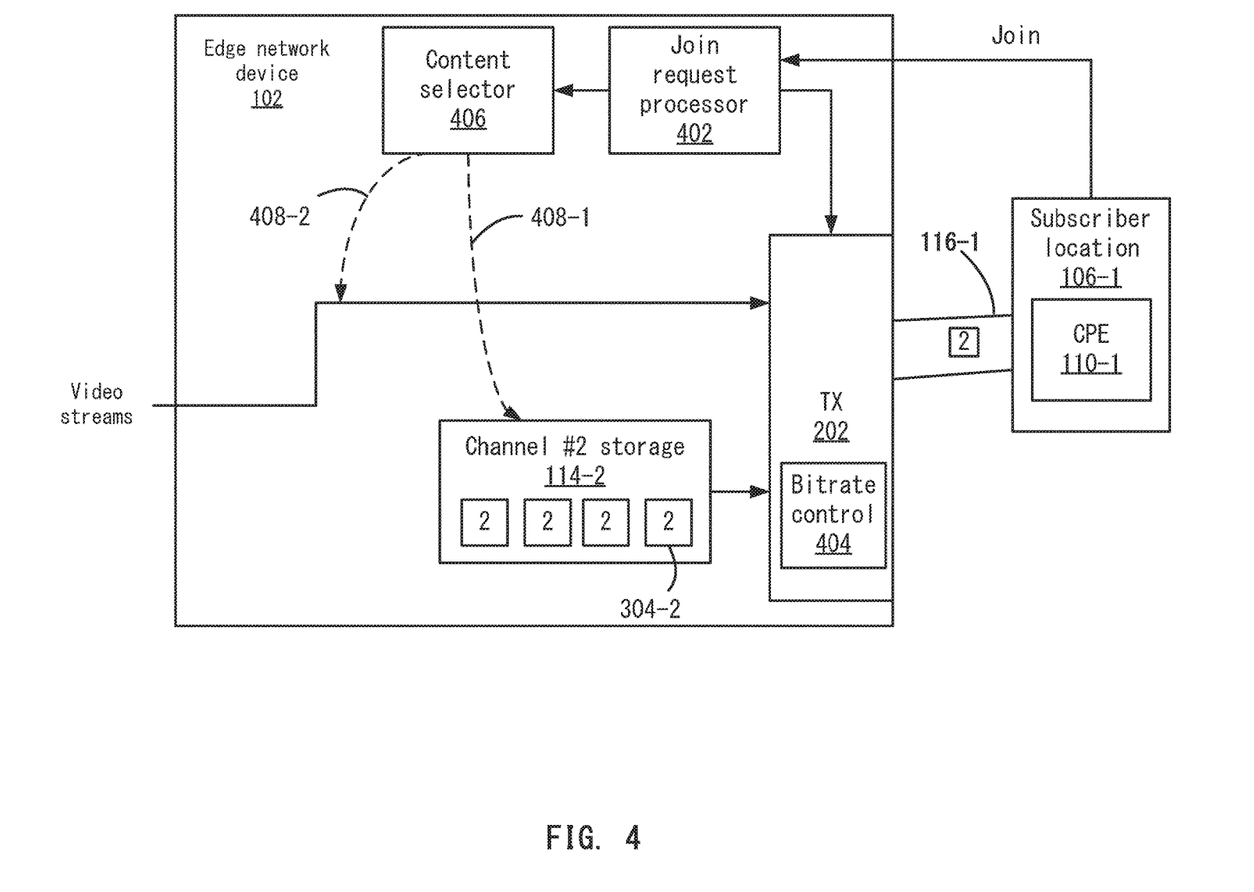
FIG. 4 depicts a more detailed example of the channel change processor according to one embodiment.

FIG. 4 depicts a more detailed example of channel change processor 112 according to one embodiment. A join request processor 402 receives join requests from customer premise equipment 110. Join request processor 402 can first determine the channel that customer premise equipment 110 wants to switch to from the request. For example, customer premise equipment 110-1 may switch from channel #1 to channel #2. Then, a content selector 406 can select channel storage 114 that is associated with that channel as shown at 408-1.

After selecting the channel storage, transmitter 202 can send the content from channel storage 114-2 to customer premise equipment 110. Transmitter 202 includes bitrate control 404 that can cause transmitter 202 to send the content from channel storage 114-2 at a higher bitrate, such as at wire speed. In this case, join request processor 402 may send a signal to bitrate control 404 that causes bitrate control 404 to increase the bitrate for content being sent to customer premise equipment 110 over subscriber line 116-1.

Join request processor 402 then processes the join request for customer premise equipment 110. For example, join request processor 402 sends the join request to content selector 406, which can then select the current stream for the join request for the new channel when the content from channel storage 114-2 has been sent. Once the GOP from channel storage 114-2 has been sent to customer premise equipment 110, then content selector 406 may join the video stream for channel #2. The content for channel #2 that is received from the multicast stream and sent to transmitter 202. Because edge network device 102 has already joined multicast streams for all of the channels, edge network device 102 does not need to send another join request to content source 104 to join channel #2. Rather, edge network device 102 notes that customer premise equipment 110 has joined channel #2. This may be allow the join request to be processed faster than if the join request needed to be sent to content source 104. Once joining the stream for the channel, content selector 406 may only send the content for the current channel being watched to customer premise equipment 110-1. Bitrate control 404 also lowers the bitrate of the content being sent to customer premise equipment 110 to the normal bitrate when the switch to the video stream for channel #2 occurs.

GOP Length Control

Figure 5:
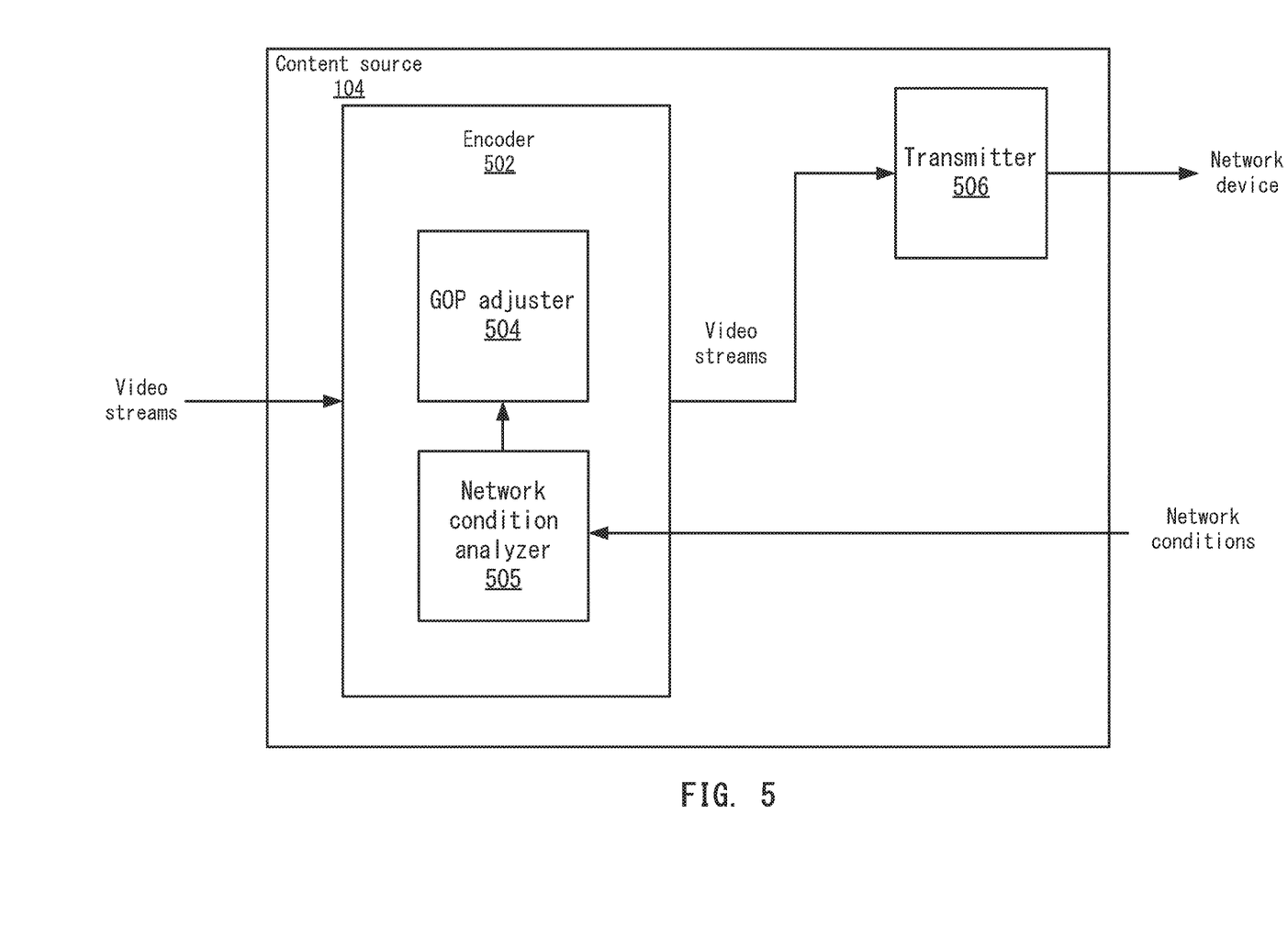
FIG. 5 depicts a more detailed embodiment of content source that is configured to send a longer group of pictures according to one embodiment.

The GOP length for channel content may be increased without experiencing longer channel change times using particular embodiments. FIG. 5 depicts a more detailed embodiment of content source 104 that is configured to send a longer group of pictures according to one embodiment. In one example, a setting or standard may specify a GOP length, such as 0.5 seconds of video for a GOP. The longer GOP length may be above a threshold where the length can make a significant effect on bandwidth used but still not affect quality.

Video codecs work with frame prediction and correction of the prediction. The prediction means that the data of one frame (I frame), then for the next frame (e.g., P frame) content source 104 only sends a prediction of that frame according to the encoder. Since the prediction may include errors, content source 104 also sends correction data in order to minimize the error. Depending on codec properties and encoder capabilities the prediction gets worse for each frame and the correction cannot cope with restoring the frame so a full frame needs to be sent again. So given that content source 104 wants to maintain the image quality, encoder 502 may analyze different conditions to make sure the longer GOP length maintains similar quality, which will be described below. In one embodiment, the GOP length may be at least 10 times longer than normally used in the settings, e.g., from 0.5 s GOP intervals to 5 s GOP intervals.

Content source 104 includes an encoder 502 that receives content for the channels and encodes the content. In one embodiment, a GOP adjuster 504 adjusts the size of the GOP that is used during encoding.

In one embodiment, GOP adjuster 504 may dynamically adjust the GOP size based on various conditions. Depending on the characteristics of the content being encoded, for instance for static content or scenes with few parts of the video changing, encoder 502 can adjust the GOP size without quality decreasing past a threshold. However, for content with a lot of motion, such as with many scene cuts or moving objects, encoder 502 may shorten the GOP length to maintain quality above a threshold. The thresholds used may be used to test whether quality has changed by an amount compared to the quality for the normal GOP length.

Also, in one embodiment, GOP adjuster 504 may increase the GOP length when additional bandwidth is needed for sending video streams through network 108. Increasing the GOP length lowers the bitrate for each channel. Thus, either more content for channels can be sent through network 108 or less bandwidth is used. If extra bandwidth is not needed, then GOP adjuster 504 may not need to increase the GOP length even if the longer length does not decrease quality.

A network condition analyzer 505 may receive network conditions regarding real-time statistics for network 108. The different conditions in which network condition analyzer 505 may consider include the available bandwidth for network 108, the number of channels that need to be sent through network 108, etc. Also, network condition analyzer 505 collects info from all video streams coming out from all encoders 502, that together with the knowledge of network conditions as well as encoder statistics on how much quality headroom is available per the threshold, network condition analyzer 505 can determine which channels could increase their GOP lengths while others need decreased GOP lengths to maintain visual quality of all channels. Then, network condition analyzer 505 may analyze the conditions to determine when to adjust the GOP length.

Encoder 502 outputs video streams for each channel to a transmitter 506. Transmitter 506 then sends the streams to recipients of multicast groups.

In one embodiment, transmitter 506 may need to signal the GOP length to edge network device 102. For example, when GOP adjuster 504 dynamically changes the GOP length, transmitter 506 can signal the new GOP length to edge network device 102 such that edge network device 104 can determine how much content to store in storage 114.

Edge network device 102 can be informed about the changed GOP length when edge network device 102 analyzes the stream. If edge network device 102 has limited storage 114, precautions about changes may be taken, such as edge network device 102 might be able to handle the changes better with extra signaling to indicate the changes or future change to plan ahead as well as edge network device 102 may emit alarms back if it has to make decisions regarding delivery of the video that may affect QoS. The CPE 110 decoding capabilities are already known by the operator and usually also defined in the codec standard as profiles and levels so signaling about GOP length variations may not necessary.

Figure 6:
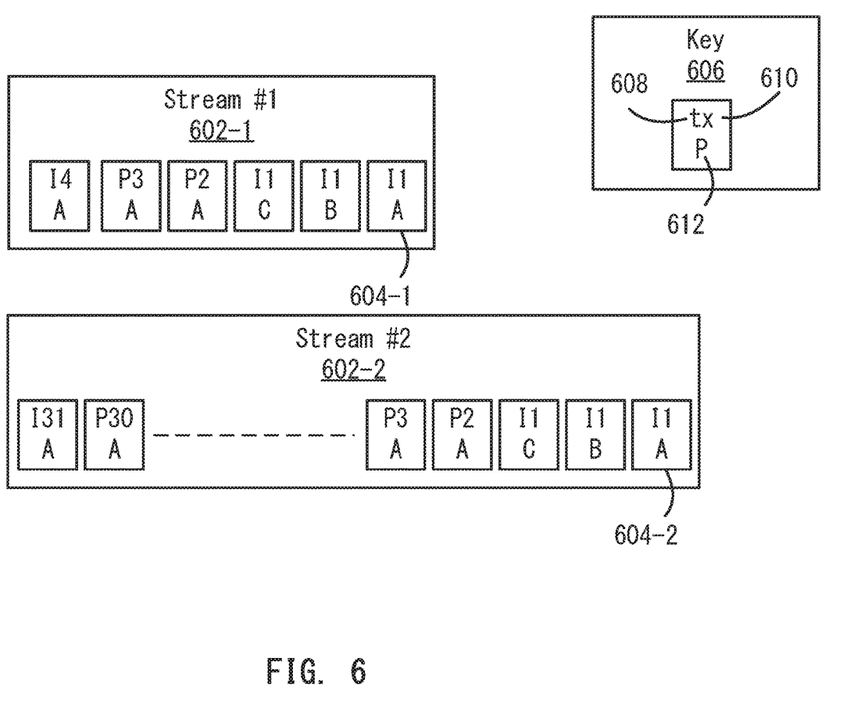
FIG. 6 depicts an example of two streams of different GOP lengths according to one embodiment.

FIG. 6 depicts an example of two streams of different GOP lengths according to one embodiment. A stream #1 at 602-1 includes a GOP length of 3 and a stream #2 at 602-2 includes a GOP length of 30. In stream #1, packets 604-1-604-6 are shown.

A key 606 shows the notations in packets 604. At 608, the picture type is shown, which may be a "I" type, a "P" type, and a "B" type in some embodiments. Other combinations of picture types may also be appreciated depending on the compression protocol used. At 610, the frame number is shown. The frame number is the number in the GOP, such as the number "1" is the first picture in the GOP, a number "2" is the second picture, a number "3" is the third picture, and the number "4" is the fourth picture. In this example, there are 3 packets for an I frame, but this may vary. There are five packets in a GOP length of 3 and thirty-two packets for a GOP length of 30. At 612, the order of a picture is shown. The order is alphabetical, where "A" is the first packet for a picture, "B" is the second packet for the picture, and "C" is the third packet, etc.

In one embodiment, if stream #1 is encoded at ten frames per second (FPS) then each frame is displayed in 0.1 seconds and one GOP duration is 0.3 seconds. This means that customer premise equipment 110 needs to collect data for a minimum of 0.3-0.6 seconds before the decoder can find a start position in stream #1. This is because at least three packets may need to be reviewed to determine the start position of stream #1. If one packet is 1 Mbit of data, then the stream #1 bitrate is: (3+2)*1 Mbit/0.3 s=16.7 Mbps.

Referring to stream #2, stream #2 has a GOP length of 30 and the same properties for stream #1. The GOP length for stream #2 is thus 3 seconds. This gives a bitrate for stream #2 of (3+28)*1 Mbit/3 s=10.3 Mbps. 10.3 Mbps is a lower bitrate than 16.7 Mbps, but stream #2 has the same visual quality as stream #1. Thus, to send the same quality content for stream #2, a lower bitrate can be used.

Method Flow

Figure 7:
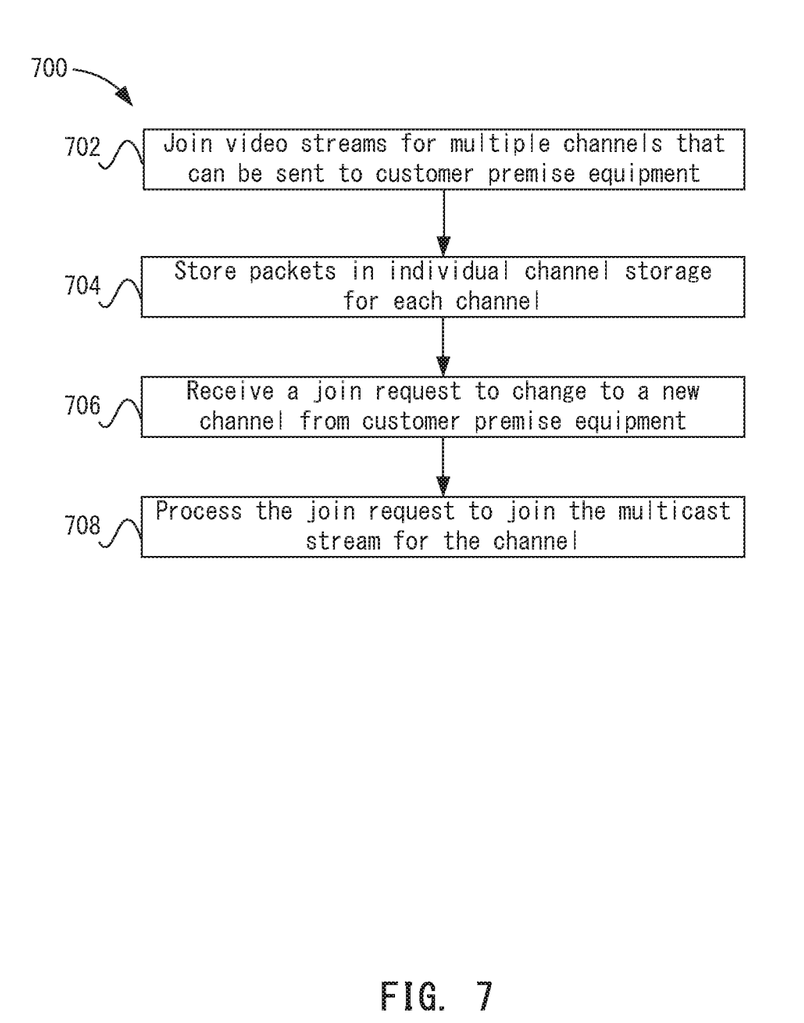
FIG. 7 depicts a simplified flowchart of a method for processing a fast channel change according to one embodiment.

FIG. 7 depicts a simplified flowchart 700 of a method for processing a fast channel change according to one embodiment. At 702, edge network device 102 joins video streams for multiple channels that can be sent to customer premise equipment 110. At 704, edge network device 102 stores packets in individual channel storage 114 for each channel. As discussed above, a packet inspector 204 may inspect the packets to determine the start of GOPs. Then, the start of a full GOP may be stored at the subscriber end of each channel storage 114.

At 706, channel change processor 112 receives a join request to change to a new channel from customer premise equipment 110. In response to the join request, channel change processor 112 can then send at least one GOP from storage 114 for the new channel to customer premise equipment 110. The GOP may be sent at a bitrate higher than the normal bitrate for a channel, such as at wire speed.

At 708, channel change processor 112 may also process the join request to join the multicast stream for the channel. Then, after the GOP is sent from channel storage 114, then edge network device 102 sends the video stream that has been joined for the new channel to customer premise equipment 110.

Accordingly, the bitrate for each channel may be reduced by using a longer GOP length. In one embodiment, the bitrate may be reduced dynamically once certain conditions occur. In other embodiments, the GOP length may be permanently reduced. To compensate for the increased GOP length, a fast channel change process is provided in edge network device 102. This allows edge network device 102 to process channel changes faster such that a subscriber does not notice the use of the longer GOP lengths. Further, the processing of the fast channel change in edge network device 102 allows customer premise equipment 110 to only send a join request to have the fast channel change process performed. Multiple requests are not required from customer premise equipment 110. Accordingly, the bitrate by channels can be reduced, and fast channel changes can be provided without having to modify customer premise equipment 110 to communicate with another FCC server to perform the fast channel change.

Computer System

Figure 8:
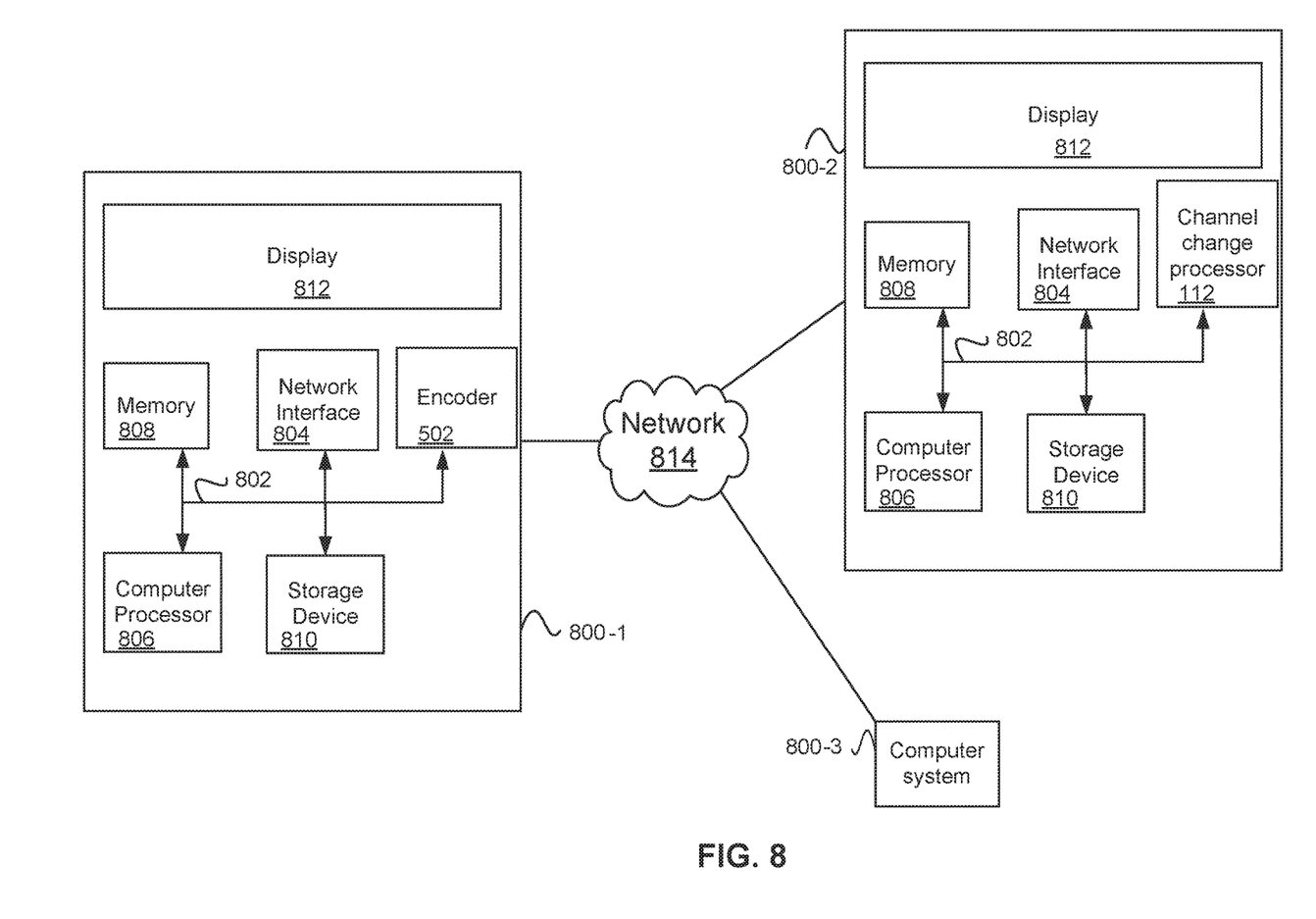
FIG. 8 illustrates an example of a special purpose computer systems configured with a fast channel change process according to one embodiment.

FIG. 8 illustrates an example of a special purpose computer systems 800-1-800-3 configured with a fast channel change process according to one embodiment. In one embodiment, computer system 800-1 describes content source 104 and includes encoder 502. Also, computer system 800-2 describes edge network device 102 and includes channel change processor 112. Only one instance of computer system 800 will be described for discussion purposes, but it will be recognized that computer system 800 may be implemented for other entities described above, such as CPE 110.

Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by particular embodiments. The instructions, when executed by one or more computer processors 806, may be configured to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for reducing time to change channels, the method comprising:
   sending, by a computing device, join requests to receive video streams for a plurality of channels from a content source;
   receiving, by the computing device, video content in the video streams for the plurality of channels currently broadcasting from the content source;
   storing, by the computing device, at least one group of pictures (GOP) of video content received for each of the plurality of channels in storage,
   for each of a plurality of customer premises equipment:
      sending a video stream for a first channel currently broadcasting from the content source in the plurality of channels to a customer premises equipment at a first bitrate at which said video stream is encoded;
      receiving, by the computing device, a channel change requests from a customer premise equipment to change from the first channel to a second channel;
      while the computing device processes the channel change, sending in the interim, by the computing device, the group of pictures of video content from the storage for the requested second channel to the respective requesting customer premise equipment, wherein said group of pictures is sent at a second bitrate prior to completion by the computing device of said channel change,
      modifying said second bitrate to have a bursting bitrate that is higher than a normal transmission bitrate for said second channel;
         increasing the second bitrate to send the stored group of pictures of video content for the second channel to the requesting customer premise equipment; and
         after sending the group of pictures of video content from the storage for the second channel, decreasing the bitrate to the normal channel transmission bitrate for said second channel to send video content that is received from the video stream for the second channel; and
      joining the video stream for the second channel broadcast by the content source and sending, by the computing device, video content that is received from the video stream for the requested second channel to the respective requesting customer premise equipment at the decreased bitrate,
         wherein the video content for the second channel is received from the content source after the channel change request is received.

2. The method of claim 1, wherein the at least one group of picture size is increased in at least one of the video streams to a second size from a first size.

3. The method of claim 2, wherein the at least one group of picture size is dynamically increased based on network conditions.

4. The method of claim 1, further comprising analyzing the video streams to select the at least one group of pictures (GOP) of video content to store for each of the plurality of channels in the storage.

5. The method of claim 4, wherein analyzing comprises:
   reviewing packets in the video stream for the second channel to determine a start location for a group of pictures for the second channel;
   selecting a packet that is the start location in the group of pictures for the second packet.

6. The method of claim 5, further comprising:
   storing the selected packet at an end of the storage for the second channel such that the selected packet is sent to the customer premise device first upon receiving the channel change request.

7. The method of claim 6, further comprising:
   storing one or more packets for the group of pictures after the selected packet in the storage for the second channel.

8. The method of claim 1, wherein the computing device sends the video content to the customer premise device via a subscriber line connected to a port of the computing device.

9. The method of claim 5, wherein reviewing packets to determine the start location comprises:
   reviewing information inside the packets to determine information in one or more fields that indicate the start location for the packets; and selected the start location based on the information in the one or more fields.

10. The method of claim 1, wherein:
the storage comprises separate storage for each of the plurality of channels, and
a set of packets is stored in each storage for each channel in the plurality of channels.

11. The method of claim 10, wherein the amount of storage for each of the plurality of channels is at least two group of pictures.

12. The method of claim 1, further comprising:
increasing the second bitrate to send the stored at least one group of pictures to the customer premise equipment; and
decreasing the second bitrate to the second channel normal transmission bitrate to send video content that is received from the video stream for the second channel after sending the stored at least one group of pictures from the storage for the second channel.

13. The method of claim 12, wherein increasing the second bitrate comprises increasing the second bitrate to a wire speed bitrate that is faster than the second channel normal transmission bitrate used to send video content that is received from the video stream for the second channel after sending the portion of video content from the storage for the second channel.

14. The method of claim 1, wherein a fixed time duration of video content for video streams for the plurality of channels is stored in the storage.

15. A non-transitory computer-readable storage medium containing instructions that, when executed, control a computer system to be configured for:
sending join requests to receive video streams for a plurality of channels from a content source;
receiving video content in the video streams for the plurality of channels currently broadcasting from the content source;
storing, by the computing device, at least one group of pictures (GOP) of video content received for each of the plurality of channels in storage,
for each of a plurality of customer premises equipment:
sending a video stream for a first channel currently broadcasting from the content source in the plurality of channels to a customer premises equipment at a first bitrate at which said video stream is encoded;
receiving, by the computing device, a channel change requests from a customer premise equipment to change from the first channel to a second channel;
while processing the channel change, sending in the interim, by the computing device, the group of pictures of video content from the storage for the requested second channel to the respective requesting customer premise equipment, wherein said group of pictures is sent at a second bitrate prior to completion by the computing device of said channel change,
modifying said second bitrate to have a bursting bitrate that is higher than a normal transmission bitrate for said second channel;
increasing the second bitrate to send the stored group of pictures of video content for the second channel to the requesting customer premise equipment; and
after sending the group of pictures of video content from the storage for the second channel, decreasing the bitrate to the normal channel transmission bitrate for said second channel to send video content that is received from the video stream for the second channel; and
joining the video stream for the second channel broadcast by the content source and sending video content that is received from the video stream for the requested second channel to the respective requesting customer premise equipment at the decreased bitrate,
wherein the video content for the second channel is received from the content source after the channel change request is received.

16. The non-transitory computer-readable storage medium of claim 15, wherein the at least one group of picture size is increased in at least one of the video streams to a second size from a first size.

17. The non-transitory computer-readable storage medium of claim 16, wherein the at least one group of picture size is dynamically increased based on network conditions.

18. The non-transitory computer-readable storage medium of claim 15, further comprising analyzing the video streams to select the at least one group of pictures (GOP) of video content to store for each of the plurality of channels in the storage.

19. The non-transitory computer-readable storage medium of claim 18, wherein analyzing comprises:
reviewing packets in the video stream for the second channel to determine a start location for a group of pictures for the second channel;
selecting a packet that is the start location in the group of pictures for the second packet.

20. An apparatus comprising:
one or more computer processors; and
a non-transitory computer-readable storage medium comprising instructions that, when executed, control the one or more computer processors to be configured for:
sending join requests to receive video streams for a plurality of channels from a content source;
receiving video content in the video streams for the plurality of channels currently broadcasting from the content source;
storing, by the computing device, at least one group of pictures (GOP) of video content received for each of the plurality of channels in storage
for each of a plurality of customer premises equipment:
sending a video stream for a first channel currently broadcasting from the content source in the plurality of channels to a customer premises equipment at a first bitrate at which said video stream is encoded;
receiving, by the computing device, a channel change requests from a customer premise equipment to change from the first channel to a second channel;
while processing the channel change, sending in the interim, by the computing device, the group of pictures of video content from the storage for the requested second channel to the respective requesting customer premise equipment, wherein said group of pictures is sent at a second bitrate prior to completion by the computing device of said channel change,
modifying said second bitrate to have a bursting bitrate that is higher than a normal transmission bitrate for said second channel;
increasing the second bitrate to send the stored group of pictures of video content for the second channel to the requesting customer premise equipment; and after sending the group of pictures of video content from the storage for the second channel, decreasing the bitrate to the normal channel transmission bitrate for said second channel to send video content that is received from the video stream for the second channel; and joining the video stream for the second channel broadcast by the content source and sending video content that is received from the video stream for the requested second channel to the respective requesting customer premise equipment at the decreased bitrate, wherein the video content for the second channel is received from the content source after the channel change request is received.

* * * * *